UNITED STATES PATENT OFFICE.

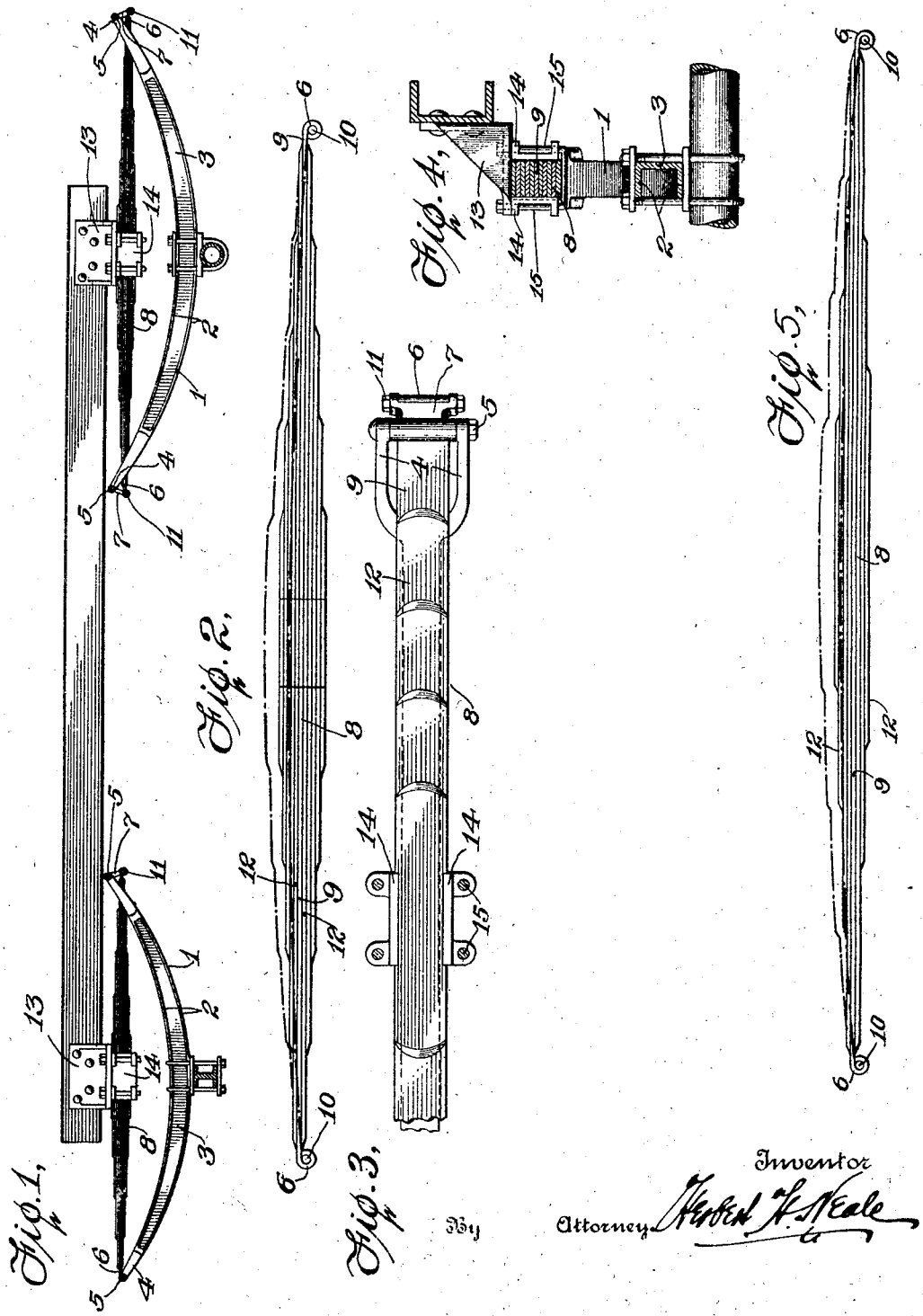

HERBERT H. NEALE, OF NEW YORK, N. Y.

SPRING SUSPENSION OF SELF-PROPELLED VEHICLES.

1,389,100.  Specification of Letters Patent.  Patented Aug. 30, 1921.

Application filed October 6, 1916. Serial No. 124,036.

*To all whom it may concern:*

Be it known that I, HERBERT H. NEALE, a citizen of the United States of America, residing in New York, N. Y., U. S. A., have invented certain new and useful Improvements in the Spring Suspension of Self-Propelled Vehicles, of which the following is a specification.

My invention relates to a spring and spring suspension in which are employed the devices and elements, and combination of devices and elements, hereinafter described, and set forth in the several claims.

The object of my invention is to provide in a spring and spring suspension certain devices and elements by means of which the bodies of motor-driven and self-propelled vehicles, automobiles and trucks, will ride smoothly and without jars, rebound, shocks, side-sway and lurching when passing over rough and uneven pavements and roads. I attain this object by the means illustrated in the accompanying drawings, forming a part of this specification, in which—

Figure 1 is a side elevation of the cradle spring suspension with single springs fitted to the side-frame of a chassis.

Figs. 2 and 5 are side elevations of single springs.

Fig. 3 is a partial plan view of the spring showing the yoke-end of the cradle and spring attachment with shackle.

Fig. 4, is a cross section of the cradle spring suspension, with single spring, showing details of attachment to side-frame of chassis and to axle.

The same numbers of reference refer to like parts throughout the several views.

In the drawings 1 represents the cradle, of which there will be four, attached on, under or to, or integral with, the axles at right angles, one to each axle on each side of the chassis. The cradle may be made in the same manner as the chassis side-frame, of steel pressed to a channel or any other stress and strain resisting section, or may be wrought, cast or forged of any other metal or combination of metals or fashioned out of any other material to any section, rigid and non-flexible. In shape it may be semi-elliptical to any degree, or any other shape whereby the ends shall be above the level of the center, or it may be flat or straight for use with semi-elliptical or similar springs. Made of steel pressed to channel or similar section, the flanges 2 2 may be the same width the whole length, the web 3 3 being widest at the point designed to be attached to the axle and tapering toward the ends to which shall be welded or riveted, or both, cast or forged lugs with yokes 4 4, the same being provided with bolt-holes for bolts 5 5, the correct width to receive the spring ends 6 6. To the yokes 4 4 shackles 7 7 are attached at either one or both ends of the cradle 1.

In the drawings 8 represents the spring, so designed and of such strength that it shall be straight or nearly straight or flat, when under normal load. That is to say, under normal load of chassis, body and passengers or load, the main leaf 9 of the spring will be in practically an even plane between the points of suspension. The spring is constructed of a main leaf 9 of vanadium or other high class spring steel, and forged over at each end 6 to form a hole 10 to receive a suspension bolt 5 or 11. Then pairs of leaves 12 12, are placed each side of the main leaf 9, in graduating lengths, the longest being next to the main leaf and the shortest leaves finally at the top and bottom and all fitted with U form clips or other means in common use to prevent the leaves from spreading, not shown. The number and thickness of the leaves 12 12 may vary according to the weight and service required of the vehicle, automobile or truck for which they are constructed, or there may be graduated lengths of leaves 12 on one side only of the main leaf 9, or there may be graduated lengths of leaves 12 12 on both sides of the main leaf 9 but more on one side than the other as shown in Fig. 5. The several leaves forming the spring may be secured together by a cast or wrought plate 14 14, on one or both sides at the mid point of the spring, in conjunction with U bolts 15, which clamp the whole to the fittings 13 on the chassis frame. The length of the shackle or shackles 7 7 may vary to suit the service for which the suspension is designed.

By my above described invention the entire weight of the chassis and body of the vehicle, automobile or truck is brought to bear on the center or near the center and at the thickest part of the springs. The jars and shocks resulting from uneven roads and pavements are transmitted through the wheels, axles and rigid cradles to the thin and flexible ends 6 6 of the springs at the points of suspension where they are most quickly absorbed and transmitted to a negligible degree through the thick portion of the springs on which the chassis and body with its passengers or load rides smoothly and easily. And, on account of the practically flat springs in the rigid cradles, that which is commonly known as side-sway is practically if not entirely eliminated.

It will be readily seen from the above description that, although various types of suspended springs may have been employed in buggies, carriages and similar horse-drawn vehicles, in my cradle spring suspension for self-propelled vehicles, automobiles and trucks, by my arrangement of the cradles on the axles at right angles, with the springs suspended therein and attached at the four corners of the chassis or body, parallel with the side frame of same and in line with the direction of travel, so that each individual spring in its respective cradle is actuated independently of any of the other springs, by any sudden depression or bump of the road surface over which the wheel nearest such spring suspension may pass, I minimize the resultant shock or jar to the chassis or body and the tortional twist that would be given to springs placed parallel with the axle and transversely to the body under similar circumstances is eliminated, even if such previously conceived vehicle (horse-drawn) springs and suspensions could be adapted to the rigorous use and high speed travel of the modern automobile and self-propelled vehicle.

Having described my invention, what I claim and desire to secure by Letters Patent is—

1. On a self-propelled vehicle, a spring suspension comprising a relatively rigid cradle supported by the vehicle axle at right angles thereto and a double-ended laminated spring connected at its thin ends to the ends of the cradle and rigidly connected at its thick intermediate portion to the frame of the vehicle.

2. A spring suspension for automobiles and like vehicles, comprising a relatively rigid cradle supported by the vehicle wheel at right angles to the axle, and double-ended laminated spring means having thin ends connected to the ends of the cradle and a thick intermediate portion rigidly connected to the frame of the vehicle.

3. On a self-propelled motor vehicle, a spring suspension comprising a relatively rigid cradle having its ends displaced from the level of its center and supported by the vehicle wheel at right angles to the axle, and a double-ended laminated spring means having its thin ends connected to the ends of the cradle and its intermediate portion rigidly connected to the vehicle frame and standing substantially straight between those ends under normal load.

In testimony whereof I have signed this specification.

HERBERT H. NEALE.